United States Patent
Manovit et al.

(10) Patent No.: US 8,099,703 B1
(45) Date of Patent: Jan. 17, 2012

(54) METHOD AND SYSTEM FOR VERIFYING POWER-OPTIMIZED ELECTRONIC DESIGNS USING EQUIVALENCY CHECKING

(75) Inventors: Chaiyasit Manovit, Mountain View, CA (US); Sridhar Narayanan, Cupertino, CA (US); Sridhar Subramanian, Cupertino, CA (US)

(73) Assignee: Xilinx, Inc., San Jose, CA (US)

( * ) Notice: Subject to any disclaimer, the term of this patent is extended or adjusted under 35 U.S.C. 154(b) by 481 days.

(21) Appl. No.: 12/325,976

(22) Filed: Dec. 1, 2008

(51) Int. Cl.
 *G06F 9/455* (2006.01)
 *G06F 17/50* (2006.01)

(52) U.S. Cl. ........ 716/133; 716/103; 716/104; 716/105; 716/106; 716/107; 716/108; 716/113; 716/132; 716/134; 716/135

(58) Field of Classification Search .................. 716/103, 716/106–109, 132–135
See application file for complete search history.

(56) References Cited

U.S. PATENT DOCUMENTS

| | | | | |
|---|---|---|---|---|
| 6,321,173 | B1 * | 11/2001 | Foster | 702/109 |
| 6,691,286 | B1 * | 2/2004 | McElvain et al. | 716/103 |
| 7,849,428 | B2 * | 12/2010 | Barowski et al. | 716/106 |
| 8,015,521 | B2 * | 9/2011 | Moon | 716/107 |

* cited by examiner

*Primary Examiner* — Nghia Doan
(74) *Attorney, Agent, or Firm* — Fernandez & Associates, LLP; Gerald Chan; Thomas George

(57) ABSTRACT

Embodiments of the present invention provide methods and systems for verifying functional equivalence of a power optimized design and its original, unoptimized design (referred to as the golden design) using combinational equivalency checking. Due to some inherent limitations which make combinational equivalency checkers unable to prove equivalency of the two designs in a single step, a series of intermediate design transformations is introduced. These transformations are dependent on the techniques used in generating the power optimized design from the golden design, and may be generically described in a transformation language that provides the necessary constructs to specify an entire set of valid structural modifications. The equivalency between the golden design and the power optimized design can then be verified by checking the golden design and the first design transformation, and then by checking between each pair of the plurality of intermediate design transformations, and finally by checking the last design transformation and the power optimized design.

22 Claims, 10 Drawing Sheets

METHOD AND SYSTEM FOR VERIFYING POWER-OPTIMIZED ELECTRONIC DESIGNS USING EQUIVALENCY CHECKING

BACKGROUND

A. Technical Field

This invention pertains to equivalency checking techniques that verify the design of a power optimized digital integrated circuit, system-on-chip (SOC), or other electronic design.

B. Background of the Invention

Equivalency checking is an important application of formal verification techniques in the semiconductor industry. Replacing millions of simulation cycles, equivalency checking is used to demonstrate the correctness of RTL synthesis results and gate-level optimizations. One example application of equivalency checking is to verify functional equivalence of combinational circuits after multi-level logic synthesis. In a typical scenario, there are two structurally different implementations of the same design, and the problem is to prove their functional equivalence.

Equivalency checking is either combinational or sequential. In combinational equivalency checking only the combinational portions of the two designs are compared, and implications about the sequential behavior are derived by establishing a 1-to-1 mapping between the register inputs and outputs of the two designs. The reduction from sequential to combinational reasoning makes the checking problem easier but relies on the construction of a mapping between registers. Register mappings can often be constructed partially or fully in an automatic fashion, and for designs with aggressive register optimizations, deriving the register mappings is not a trivial process. In sequential equivalency checking, the full combinational and sequential behavior is considered together. Sequential equivalency checking is computationally harder than combinational checking and does not require a 1-to-1 correspondence in register mappings. In fact, the term sequential is only used to explicitly distinguish from combinational equivalency checking which due to its widespread use has become synonymous with equivalency checking.

If one considers an implementation of the original design and an alternate implementation of the original design, then equivalency checking is the analysis of the structural differences between the two implementations and the determination of their equivalence. Several electronic design automation companies, including Cadence, Synopsys, Calypto, and Magma Design Automation, offer products that provide equivalency checking capability. These equivalency checking products give consistent results when analyzing the functionality of the original design against the functionality of alternate implementations of the design.

Functional equivalency checking is used to check whether two designs are functionally equivalent; that is, on the same input sequences they both produce the same output sequences. The equivalence is said to be functional because it is only concerned with logical behavior and not necessarily aware of technology dependent factors such as speed, area, and power consumption. Though cost efficient, the application of equivalency checking requires both a certain amount of know-how and a fair amount of setup to be successful.

As low power consumption becomes a critical requirement in many designs, power optimizations will have to be provided in early phases of the design. In generating such power-optimized versions of an original design, it is imperative that the functional behavior of the design is unchanged. Thus, a method and apparatus for automating the verification of power optimized designs will be desirable.

SUMMARY OF THE INVENTION

Embodiments of the present invention provide methods and systems for verifying the functional equivalence of a power optimized design and its original, unoptimized version (golden design) using combinational equivalency checking. Due to certain inherent limitations which make combinational equivalency checkers unable to prove equivalency of the two designs in a single step, a series of intermediate design transformations is introduced. These transformations are dependent on the techniques used in generating the power optimized design from the golden design. One way to specify how to generate any of these intermediate design transformations is through use of a transformation language. Such a language would provide the necessary syntax and semantics (or more generally a formal grammar) and the associated constructs to specify an entire set of valid structural transformations. Hence one can use constructs in this language to capture the required structural transformations to be performed on a design to generate any of the intermediate design transformations. The equivalency between the golden design and the power optimized design can then be verified by checking the golden design and the first design transformation, by checking between each pair of the plurality of design transformations, and finally by checking the last design transformation and the power optimized design. However, the sequence of verification is flexible and may be specified by the user. The combinational equivalency checker's support for retiming principles may be utilized during these verification steps. The power optimized design may utilize logic gated and/or clock gated technology in obtaining its power savings. Furthermore, the equivalency checker can be either a combinational equivalency checker or a sequential equivalency checker.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

Figure ("FIG.") 1 illustrates a non-clock gated design, and a clock gated design, according to various embodiments of the invention.

DETAILED DESCRIPTION OF THE PREFERRED EMBODIMENTS

In the following description, for purpose of explanation, specific details are set forth in order to provide an understanding of the invention. It will be apparent, however, to one skilled in the art that the invention may be practiced without these details. Reference is made to the preferred embodiments of the invention. While the invention is described in conjunction with the preferred embodiments, the invention is not intended to be limited by these preferred embodiments. On the contrary, the invention is intended to cover alternatives, modifications and equivalents, which may be included within the spirit and scope of the invention as defined by the appended claims. For example, the present invention may apply to system-on-chip designs, FPGAs, custom ASIC and processor designs, structured ASICs and discrete electronic designs. Furthermore, in the following detailed description of the invention, numerous specific details are set forth in order to provide a thorough understanding of the invention. However, the invention may be practiced without these specific details.

As low power consumption becomes a critical requirement in many designs, power optimizations will have to be provided in early phases of the design. Specifically, there is a need to incorporate significant optimizations to reduce power in the micro-architecture and register-transfer level (RTL) phases of a design. These savings in power can be achieved both through use of automated tools and through manually incorporating design techniques. In generating such power-optimized versions of an original design, it is imperative that the functional behavior of the design is unchanged. Thus, a method and apparatus for automating the verification of power optimized designs will be desirable.

Introduction

Figure 1:
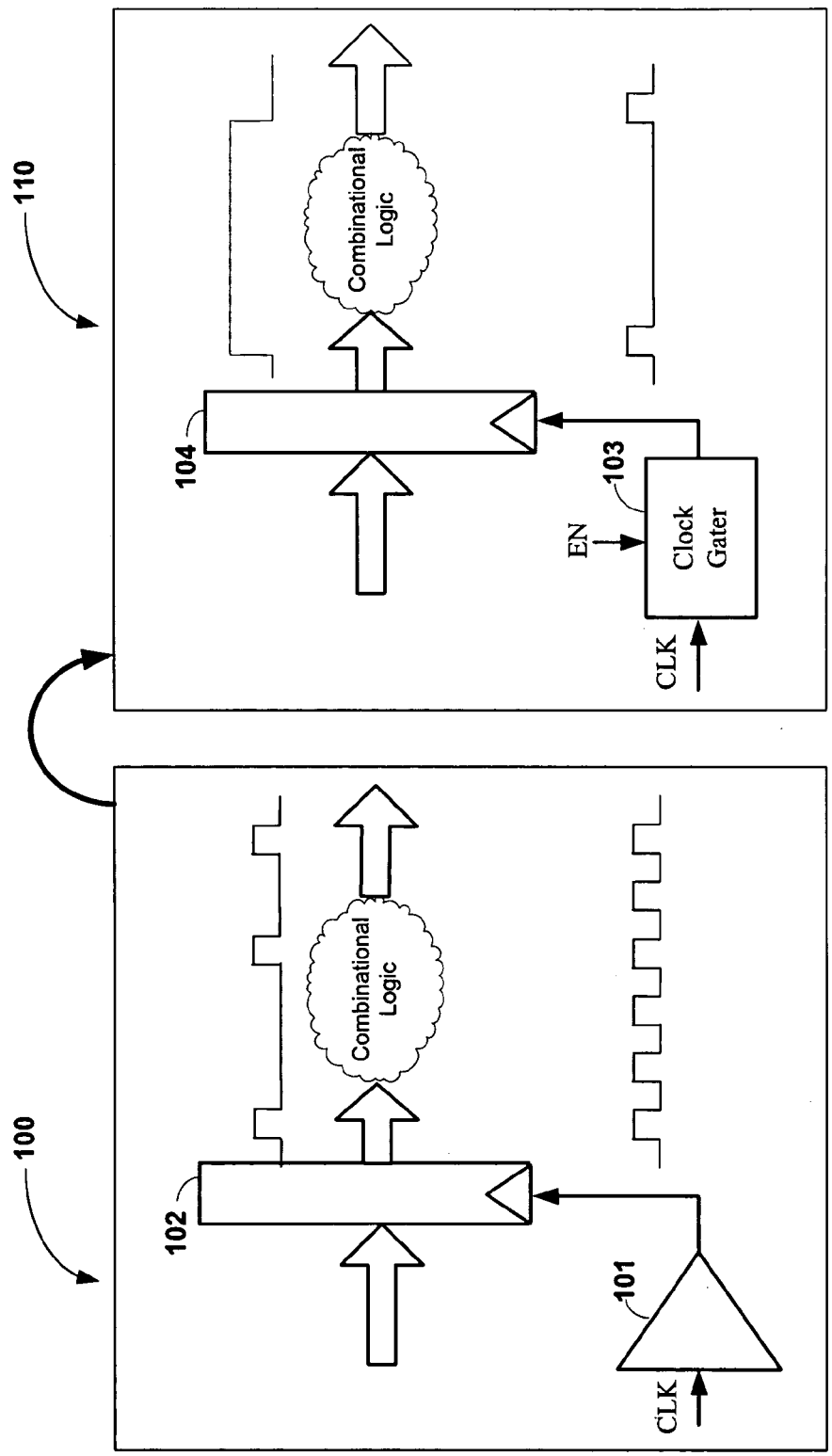

The present invention provides methods and systems for verifying a power optimized design using combinational equivalency checking. The power optimized design may utilize logic gated and/or clock gated technology. For example, the power optimized design may be based upon unique clock gating technology that provides a significant reduction in the active power of a digital design. The main idea is to employ fine-grained clock gating in a pervasive and efficient manner to reduce both the clock activity and associated digital logic activity. FIG. 1 illustrates a typical implementation of a non clock gated design 100 and a clock gated design 110 where the last stage buffer of the clock network 101 is replaced with a clock gater element 103 conditioned by an enable (EN) signal. A clock gater is a gating element that is controlled by an enable signal and can be used to replace the last stage buffer in the clock network. The purpose of clock gating is to reduce dynamic power in a design.

In the original design, the clock signal directly feeds the register 102. Since the clock usually switches unconditionally, the output of register 102 continuously tracks the input to register 102. In contrast, on the right-hand side of FIG. 1, the clock is conditioned by the clock gater 103 before being fed to the register 104. The switching activity at the output of the clock gater 103, the gated clock, is controlled by the EN signal. By intelligently controlling the EN signal, the output of the clock gater 103 and consequently the output of the register 104 can have significantly lower switching activity and this can reduce the total power consumption. By introducing a clock gater controlled by the EN signal into the last stage of the clock network, design 110 is a clock-gated design and obtains lower switching activity both at the output of clock gater 103 and at the output of the register 104. In cases where one cannot introduce a clock gater into the clock network (for reasons of area, timing or clock network constraints), one can generate a logic gated design from design 100 using the same EN signal as identified for clock gating. In this case for example, one can introduce a 2-to-1 multiplexer at the input of register 102. One data input to the multiplexer would be the current input to register 102, the second data input would be the output of register 102, and the EN signal can be used as the select signal to the multiplexer. Hence when the EN signal is 0, the output of register 102 is re-circulated back to its input. Consequently, the logic gated design only reduces switching activity at the output of register 102 and does not reduce the switching activity in the clock network. Since the logic gated design uses the same enable signals as identified for a clock-gated design, we will use the term clock gating techniques to specify the means by which enables are generated for a clock-gated and/or logic gated design.

The clock gating efficiency (or equivalently the degree of reduction in both the clock and logic switching activity) for any clock gater is primarily dependent on the way the EN signal is constructed. A power optimization engine embodies techniques, which may be proprietary, to derive the enables from existing signals in the design. In doing so, the goal is to maximize the clock gating efficiency within the constraints of minimizing any impact on timing closure and area. More importantly, a fundamental requirement in modifying a design to reduce the power is to ensure that design functionality is unchanged using the power optimization engine.

The use of formal equivalency checking is one way to guarantee that both the original design and the power optimized design have identical functionality. Combinational equivalency checkers such as Conformal-LEC from Cadence or Formality from Synopsys may be used in this equivalency verification process. Furthermore the equivalency checker can be a combinational equivalency checker or a sequential equivalency checker.

In the following paragraphs, the original non-clock gated design is referred to as the golden design and the power optimized modified design is referred to as the clock-gated design.

In an instance when a given equivalency checker is unable to prove equivalency of the golden and the clock-gated designs in a single step, a series of intermediate design transformations pertaining to the present invention is introduced. These transformations are structural logic transformations which are dependent on the clock gating techniques used in generating the clock-gated design from the golden design. The equivalency between the golden design and the clock-gated design can then be verified by checking the golden design and the first design transformation, checking between each pair of the plurality of design transformations, and then by checking the last design transformation and the clock-gated design. However, the sequence of verifying each pair of designs is flexible and may be specified by the user. Some examples of complex clock gating techniques used in the clock-gated design that require a series of such intermediate design transformations in the equivalency checking process include:

- use of output side clock gating techniques with relaxed timing constraints
- use of output side clock gating techniques with stringent timing constraints
- use of a combination of output and input side clock gating techniques
- use of complex input side clock gating techniques
- Some of these complex clock gating techniques will be discussed in more detail in the following paragraphs.

Clock Gating Paradigms

The present invention relies on the use of complex clock gating techniques typically embodied in a power optimization engine. As an example, the power optimization engine can use the concept of clock gating paradigms to both identify clock gating opportunities in a design and derive the corresponding enable signals. The paradigms to be discussed in the following sections illustrate the impact of using both simple and complex clock gating techniques on the combinational equivalency checking process.

Combinational equivalency checking basically uses two key steps to verify functional equivalence between two versions of a design. The first step (often referred to as the register match or map phase) is to establish a 1-to-1 correspondence between the state points in the two versions of the designs. Once this correspondence is established, the combinational fan-in cones for each state point are extracted from the two designs. The second step (often referred to as the verify or compare phase) is to establish by analysis of the fan-in cones whether or not the respective mapped state points are in fact functionally equivalent.

Figure 2:
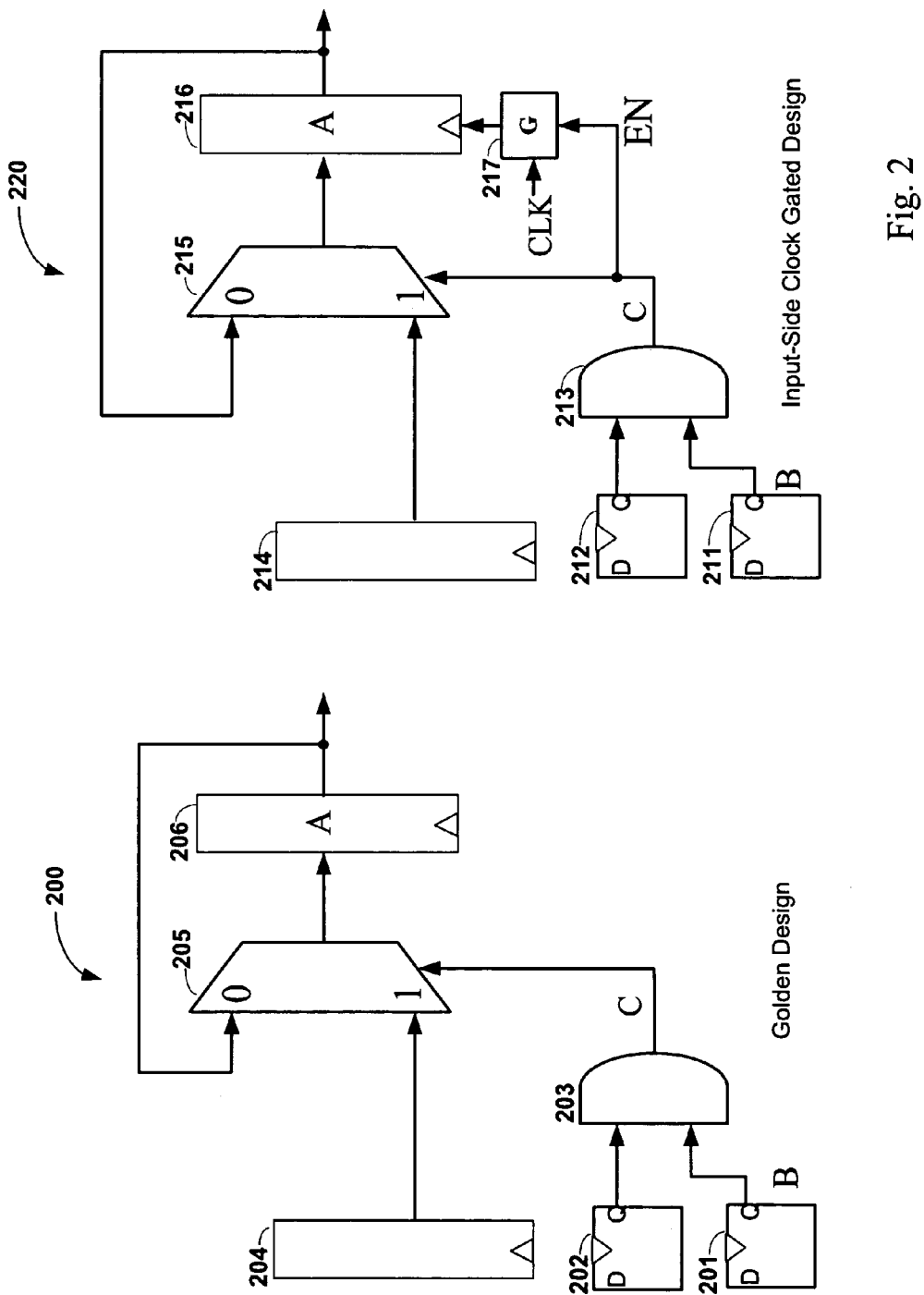
FIG. 2 illustrates the use of the feedback paradigm to clock-gate a design showing the golden design and the input-side clock-gated design, according to various embodiments of the invention.

In FIG. 2, the golden design 200 and the corresponding input-side clock gated design 220 is shown using the feedback clock gating paradigm. The feedback paradigm falls into a category of "don't-toggle" input side paradigms which take advantage of registers whose data inputs are identical to their state values over one or more cycles. In the case of FIG. 2, by virtue of identifying that when C=0, the value that register A 206 will clock is the same value it currently holds, one can derive a clock-gated design that utilizes the signal C as the enable (EN) to the clock gater 217 which controls the clock of register A 216. Note that we could have also used the input B of the AND gate 203 (and 213) as an enable signal for the clock gater. The signal B is a less efficient enable signal than C since B will assume a value of 0 less often than signal C, and hence cause less suppression of the clock at the output of clock gater 217. On the other hand, signal B imposes a more relaxed timing constraint on the enable signal since it has more timing slack than C. Use of signal C imposes a more stringent timing constraint on the enable signal since signal C is derived from signal B. In this way power optimization engines can analyze the trade-offs in terms of timing, area and clock gating efficiency prior to specifying the enable signal.

Figure 3A:
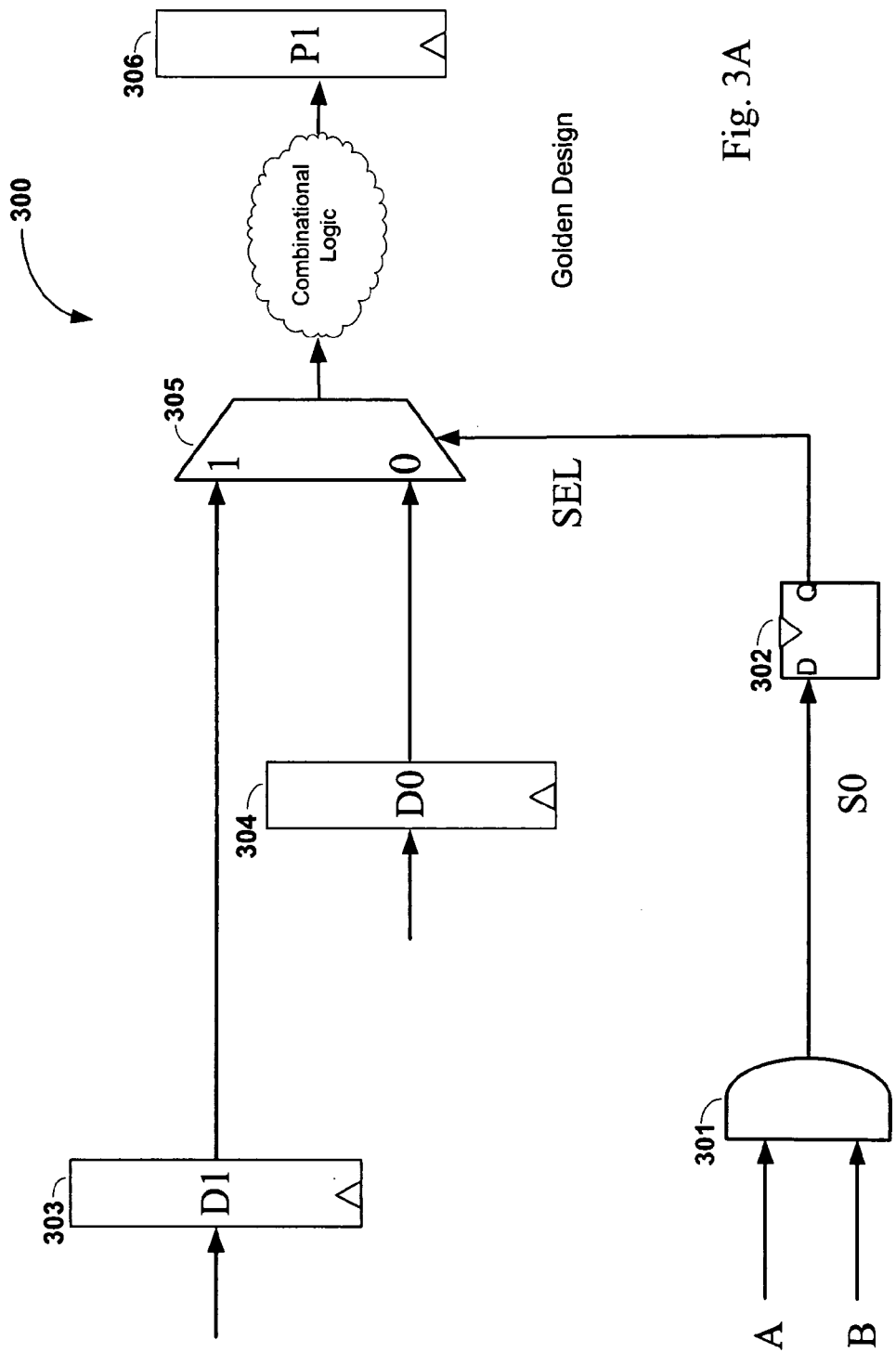
FIG. 3A illustrates a golden design with a multiplexer according to various embodiments of the invention.
Figure 3B:
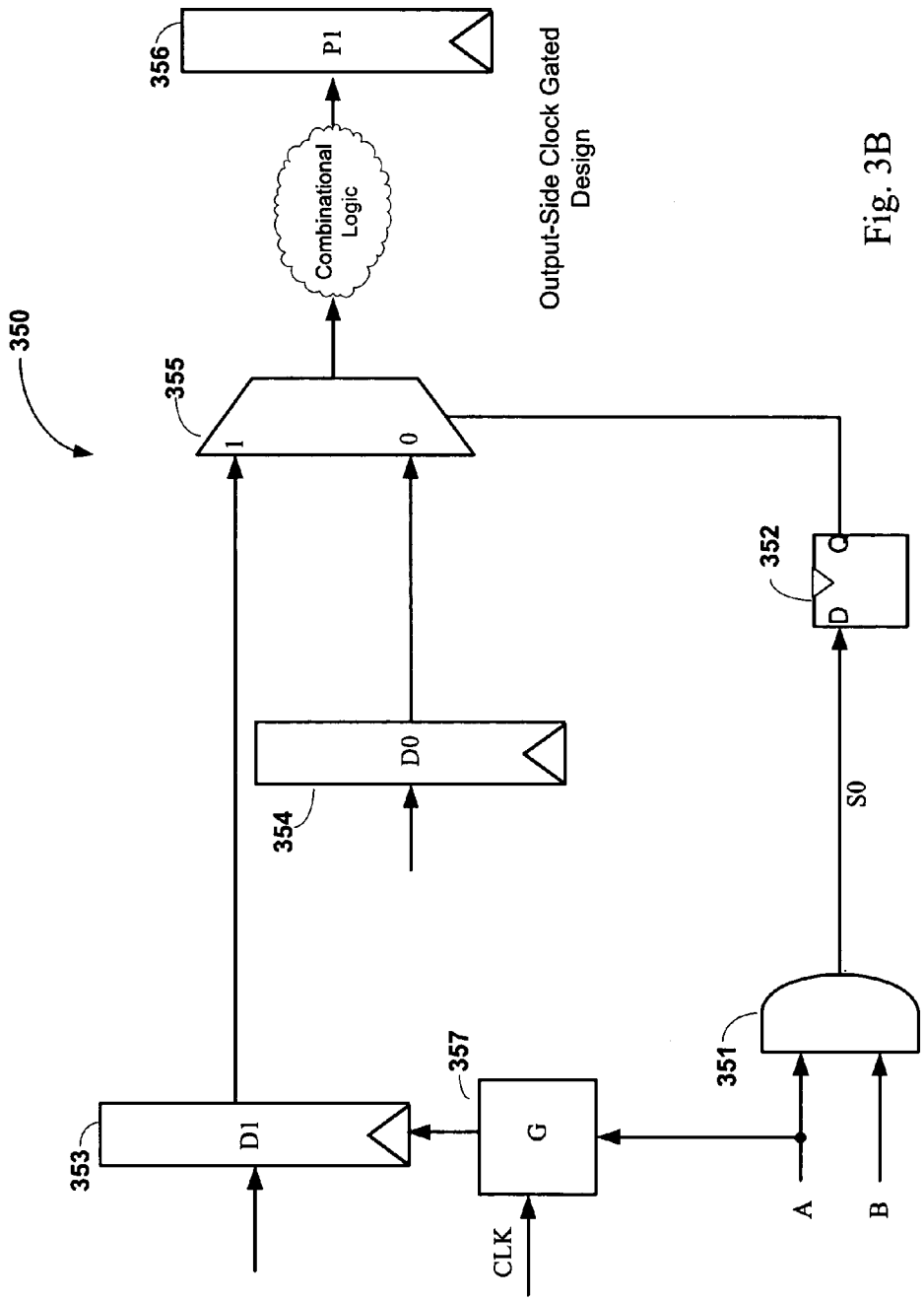
FIG. 3B illustrates an output-side clock-gated design with a multiplexer, according to various other embodiments of the invention.

There are two salient conditions to note with respect to use of the feedback paradigm as illustrated in FIG. 2. Firstly, from a cycle-to-cycle behavior point of view, both the inputs to register A 206, 216 and its outputs remain the same in both the golden design 200 and the clock-gated design 220. And secondly, the state points that drive the fan-in cone of register A 206, 216 are identical between the two designs. Per FIG. 2, the state points or register elements 201, 202, 204, and 206 are coupled to drive inputs to the register element 206 in the same manner as state points or register elements 211, 212, 214 and 216 are coupled to drive inputs to the register element 216. As a result, from an equivalency point of view, we can feed both designs as is into a combinational equivalency checker and they will be proven to be equivalent. In this case, since a simple input-side clock gating technique is used to derive the clock-gated design, no intermediate design transformations are required as part of the equivalency checking process In FIG. 3A, an example is shown of another golden design 300 and the corresponding output-side clock-gated version 350 is shown in FIG. 3B. These figures illustrate the use of the multiplexer paradigm to clock-gate a design. The multiplexer paradigm falls into the category of "don't-care" output side paradigms, where we take advantage of register outputs that are not being observed or consumed by any downstream state points in one or more clock cycles. In FIG. 3A, when A=0, the value clocked into register D1 303 in the next cycle is "blocked" at the multiplexer 305 and cannot be observed by any downstream state point or primary output. The analysis uses this information to derive the clock enable for the corresponding register D1 353, as depicted by the clock gater 357 in FIG. 3B. We can also derive the clock enable for register D0 304, 354 in a similar fashion, but it will be omitted from the discussion without loss of generality. Note that the signal S0 can also be used as a valid clock gating enable for register D1—although it provides more clock gating efficiency than signal A, it imposes a more stringent timing constraint on the enable since it is generated from signal A.

If we were to feed both designs as is into a combinational equivalency checker, registers D1 303 and D1 353 would "fail" the comparison in the verify phase because their fan-in cones differ. The introduction of the clock gater 357 makes signal A and all state points used in generating signal A part of register D1 353's fan-in cone while signal A is not present in register D1 303's fan-in cone.

Design Transformations

The above failure leads us to the intermediate design transformations needed in the golden and clock-gated designs to enable us to verify the correctness of the clock-gated design using a combinational equivalency checker. The basic idea is to (i) logically retime the clock-gated register D1 353 so that its enable is pushed into the fan-in cone of its output state space, and (ii) appropriately retime the logic involved in generating the clock enable. Retiming is a technique of moving the structural locations of register elements (flip-flops or latches) in a digital circuit to improve its performance, area and/or power characteristics. The movement of the register elements however should be done in such a manner as to preserve the functional behavior of the circuit at its outputs. An example of retiming a register is illustrated in the designs 370 and 380 of FIG. 3C. In design 370, register D0 373 is located in front of the multiplexer 372. One can retime register D0 by moving the multiplexer 372 from D0's input state space to its output state space. As illustrated in design 380, this requires one to create two registers D1 375 and D2 376 and the multiplexer 377 has its data inputs fed by the outputs of registers D1 375 and D2 376, respectively. In design 370, the signal A is used as the select line to the multiplexer 372, while in the retimed design 380, the delayed version of signal A or equivalently the output of the flip-flop 374 is used as the select line to the multiplexer 377. Although the area of the retimed design 380 is greater than the original design 370, both the designs are equivalent from a functional behavior perspective.

Figure 4A:
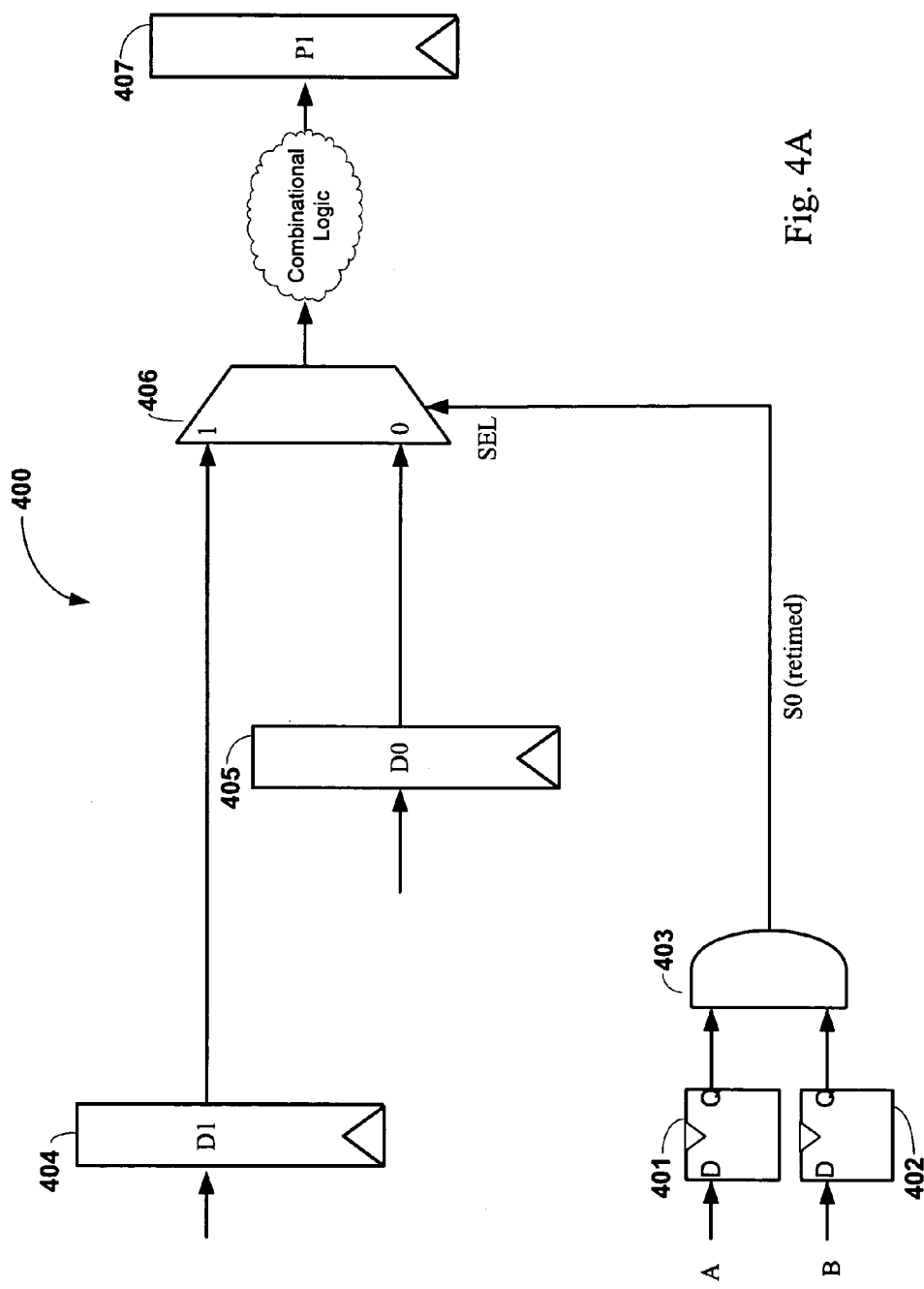
FIG. 4A illustrates a retimed design transformation of the design in FIG. 3A, according to various embodiments of the invention.
Figure 4B:
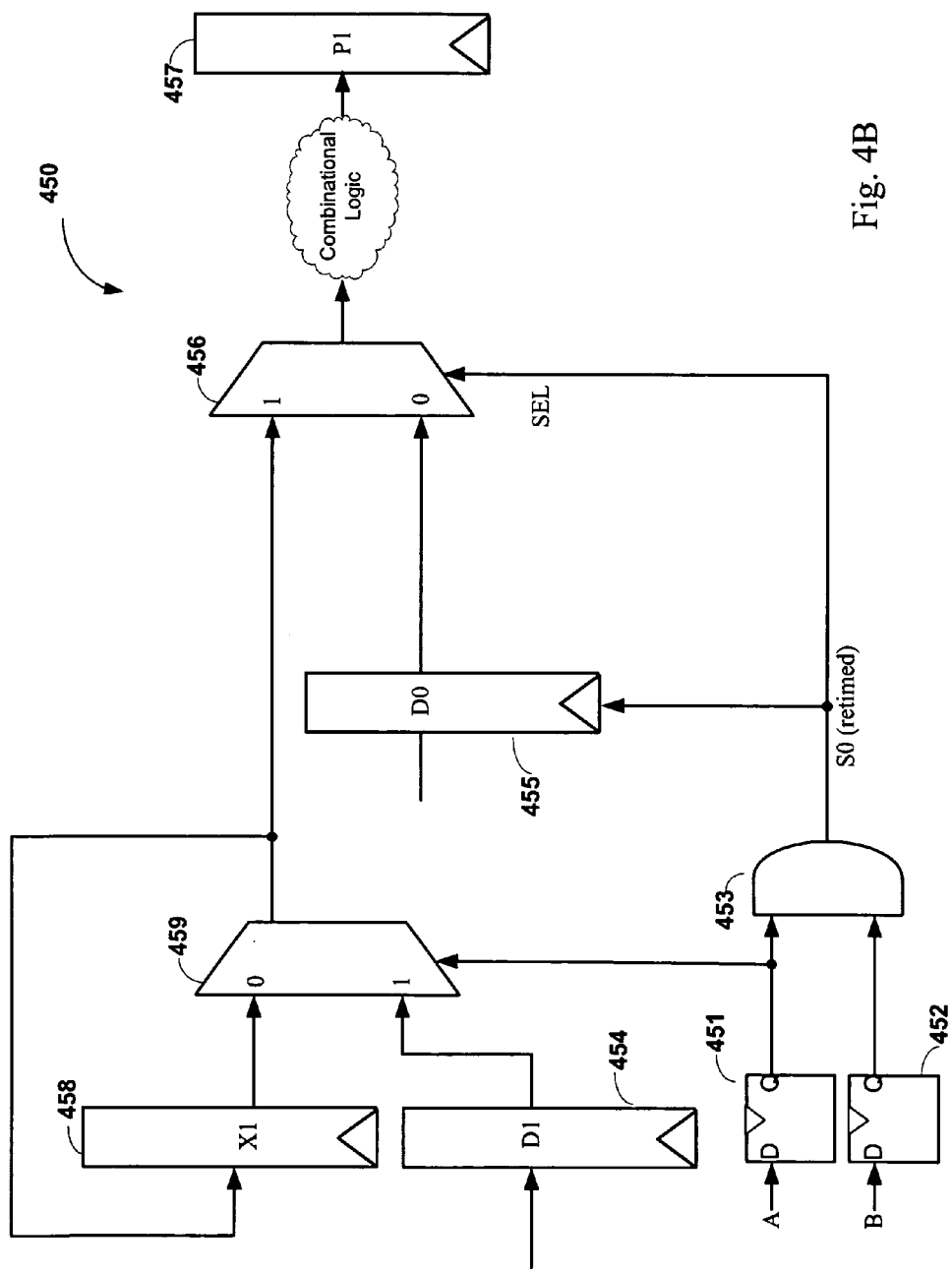
FIG. 4B illustrates an intermediate design transformation of FIG. 3B, according to various other embodiments of the invention.

FIGS. 4A and 4B illustrate the intermediate design transformations in accordance with one embodiment of the present invention. FIG. 4A is a transformed golden design 400 from that in FIG. 3A while FIG. 4B is a transformed clock-gated design 450 from that in FIG. 3B.

In applying the retiming transformations described earlier to FIG. 3B, the clock gater 357 of register D1 353 is first removed and replaced by a feedback multiplexer at the input to register D1, and the enable signal A is used as the select signal to this multiplexer. Register D1 353 is then retimed as per the example shown in FIG. 3C. As shown in FIG. 4B this results in two registers, D1 454 and X1 458, and the multiplexer denoted by 459 is now at the output of these registers. The select line of this multiplexer 459 is controlled by a retimed version of the original enable signal A, i.e., while signal A is used directly as the clock gating enable signal in FIG. 3B, its flopped version is used in FIG. 4B. The net effect of this transformation is that a "retimed" version of the clock gater enable signal A is now part of the fan-in cone to register P1 457.

Having transformed the clock-gated design, we need to ensure that the golden design is aligned with it in terms of the state points in the fan-in cone of register P1 457. In FIG. 4A, we show the corresponding retimed version 400 of the golden design. The transformation essentially retimes the single register 302 at the output of the AND gate 301 in FIG. 3A to become two registers 401 and 402 at the inputs of the AND gate 403 in FIG. 4A. Using a combinational equivalency checker, (i) the golden design 300 in FIG. 3A can be proven equivalent to the retimed design 400 in FIG. 4A, (ii) the clock-gated design 350 in FIG. 3B can be proven equivalent to the retimed design 450 in FIG. 4B, and finally (iii) the two intermediate design transformations 400 in FIGS. 4A and 450 in FIG. 4B can be proven equivalent to each other. This in turn proves the functional equivalence of the golden design 300 in FIG. 3A and the clock-gated design 400 in FIG. 3B. Using structural logic transformations similar to the above retiming transformations, a number of variations of don't-care output side paradigms used in clock-gated designs can be successfully verified using commercial combinational equivalency checkers such as Conformal LEC. In doing so, the retiming support provided in these equivalency checkers can be utilized, e.g., in Conformal LEC, retiming support is provided through use of commands and directives such as "analyze retiming-pipeline" and "analyze retiming-combinational_identical". The equivalency checker certifies designs as being equivalent when the enable signals in the clock-gated design have been constructed correctly, and flags non-equivalent state points in cases where "incorrect" clock gater enables are used in the clock-gated design.

The foregoing description mainly used retiming structural modifications in generating the intermediate design transformations. Based on the nature of the clock gating techniques used in the clock-gated design, other structural modifications may be used in addition to the retiming structural modifications. These include structural logic modifications such as the addition or removal of logic gates or flip-flops, or the addition or removal of logic terms and signals from existing gates or flip-flops.

In the foregoing description on clock gating paradigms, we individually dealt with input side and output side clock gating techniques for clarity and ease of explanation. To those skilled in the art, it will be obvious that input side don't-toggle paradigms can be combined with output side don't-care paradigms to derive more complex clock gating techniques that can achieve greater clock gating efficiencies. In a similar vein, although we illustrated a simple input side clock gating paradigm, more complex input side clock gating techniques that derive enables based on analysis across clock cycles (also known as sequential analysis) will be obvious to those well-versed in the art. Each of these complex clock gating techniques will require the use of intermediate design transformations in verifying the clock-gated design as embodied in this invention.

Figure 5:
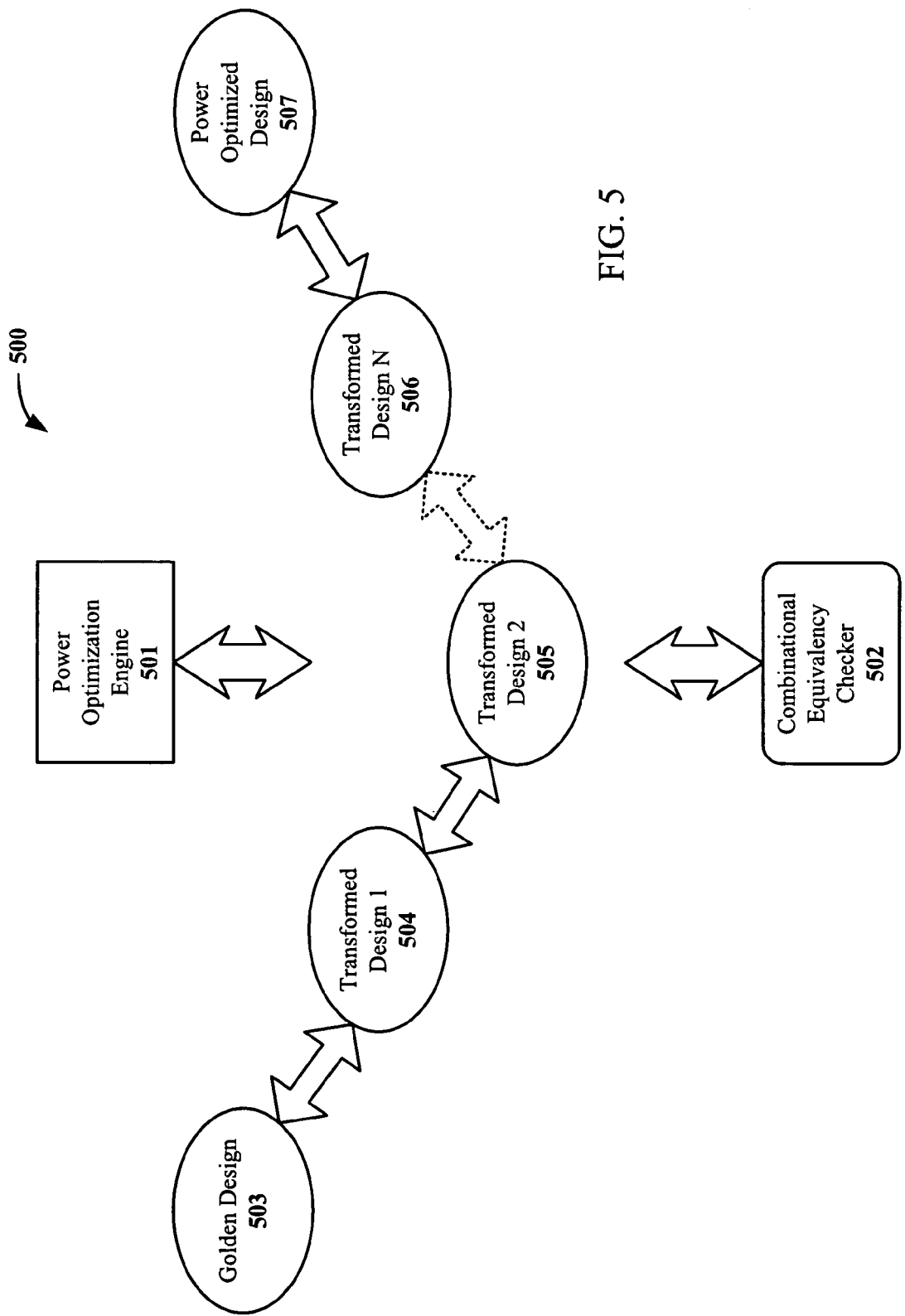
FIG. 5 illustrates the method of verifying a power optimized design using equivalency checking, according to various embodiments of the invention.

FIG. 5 illustrates the presented equivalency checking method 500 at a high level. The golden design 503 is analyzed by the power optimization engine 501 to create a power optimized design 507, which is functionally equivalent to the golden design 503, but has reduced power consumption, In order to facilitate the verification of the two designs, one or more intermediate design transformations are generated. The power optimization engine 501 determines the required number of intermediate design transformations and can specify the structural and logical modifications required to generate each of these intermediate design transformations. For example, FIG. 5 illustrates the generation of transformed design 1 504, transformed design 2 505, up to transformed design N 506.

Figure 3C:
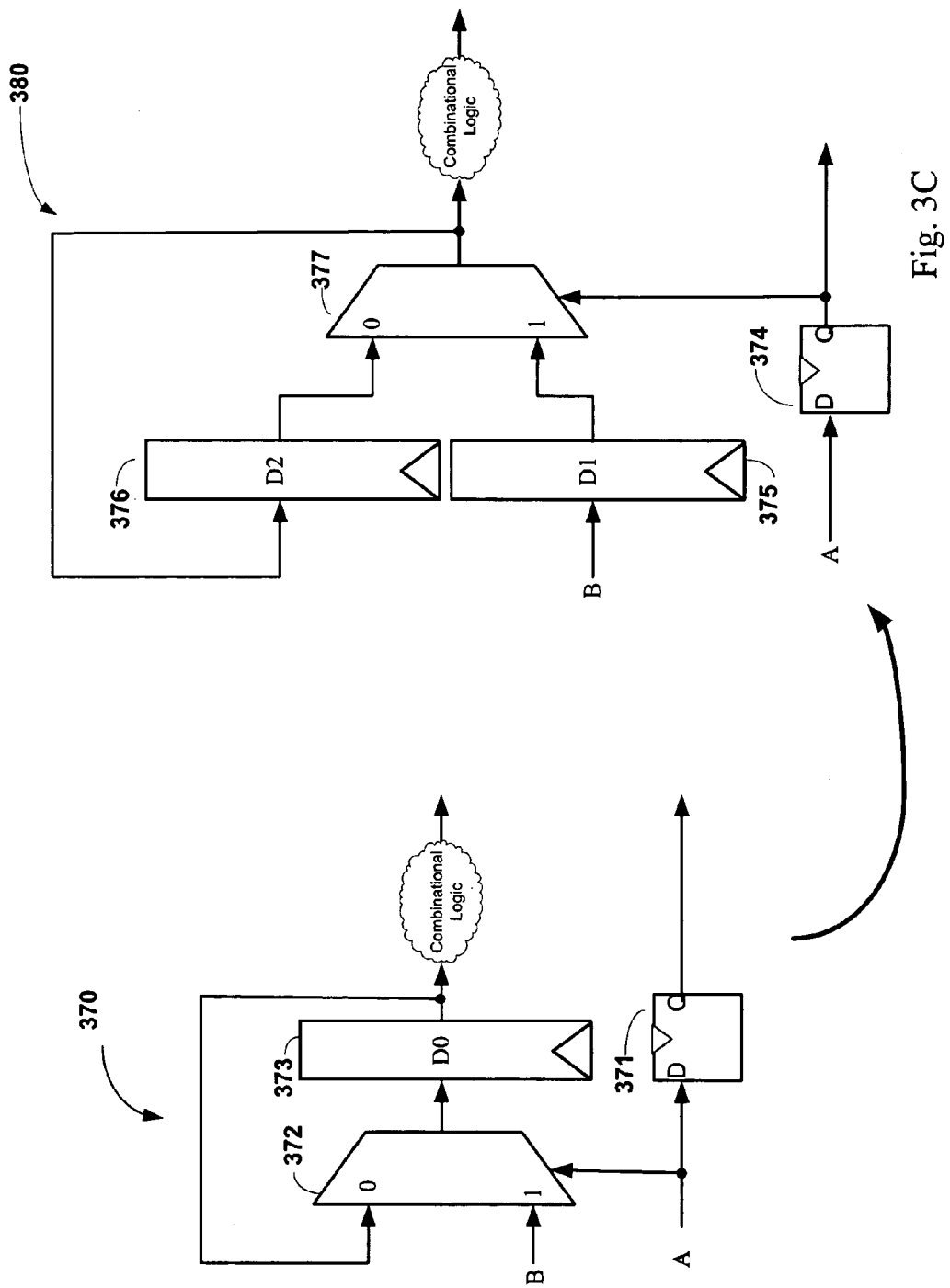
FIG. 3C illustrates an example of retiming register D0, according to various other embodiments of the invention.
Figure 6:
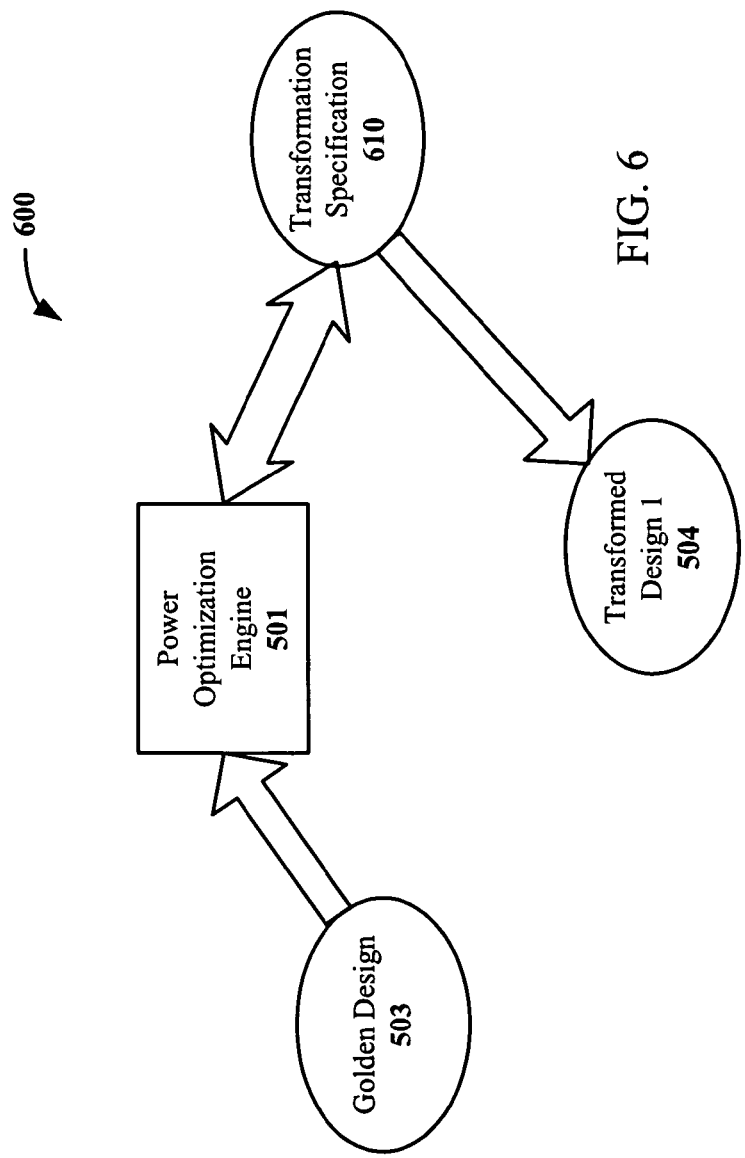
FIG. 6 illustrates the method of obtaining a transformed design, according to various embodiments of the invention.

Having established the transformed designs, the combinational equivalency checker 502 is instructed to check the equivalency between the golden design 103 and the first intermediate design transformation, i.e., transformed design 1 504, between each pair of the plurality of intermediate design transformations, and between the last design transformation, i.e., transformed design N 506, and the power optimized design 507. The sequence of verification may be as suggested above or may be specified by the user based upon their experience. The process of generating the transformed designs may be facilitated through the use of a transformation language. Such a language would provide the necessary syntax and semantics (or more generally a formal grammar) and the associated constructs to specify an entire set of valid structural transformations. For example, the language should provide constructs to describe the retiming of a register across the feedback multiplexer 372 as shown in FIG. 3C. Similarly the language should provide other constructs that capture structural, logic and retiming modifications used in generating any of the intermediate design transformations. As illustrated in FIG. 6, transformed design 1 504, may be generated as follows: After analyzing the golden design 503, the power optimization engine 501 generates a design transformation specification 610, which could be described in a transformation language as outlined earlier. This transformation specification 610 can then be applied to the golden design to generate transformed design 1 504. In various embodiments, this process of generating the transformed design may be performed by a stand-alone engine, by an engine residing in the power optimization engine, by the equivalency checker or even through manual methods.

Customer Use Model

Figure 7:
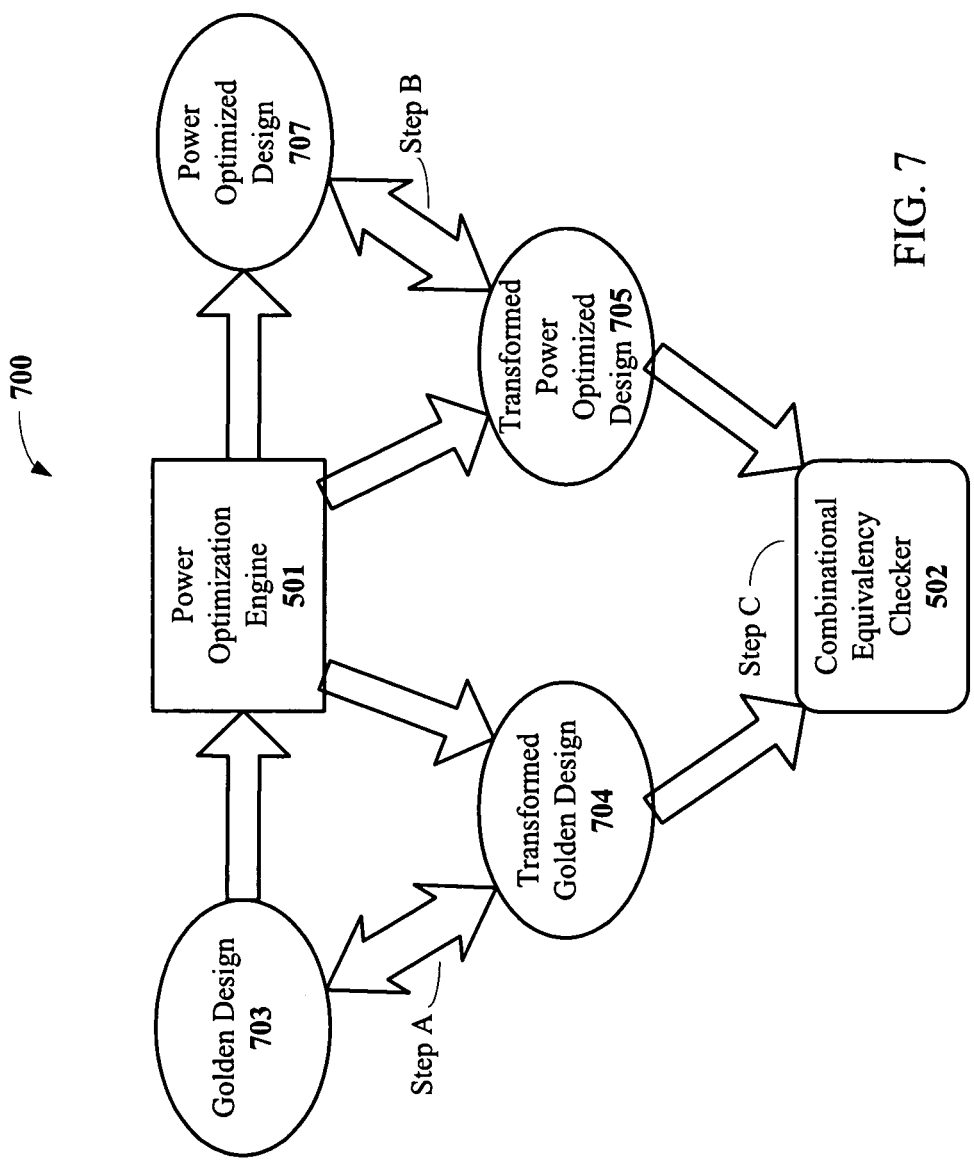
FIG. 7 illustrates the method of verifying a power optimized design using the present invention with two intermediate design transformations, according to one embodiment of the invention.

In one embodiment of the present invention, the user may generate a power optimized design where only two intermediate design transformations are required. This method 700 is illustrated in FIG. 7. A customer may create a power optimized design 707 and, using the present invention, the power optimization engine 501 will automatically generate both the transformed golden design 704 and the transformed clock-gated design 705. The modifications in the transformed golden design 704 and transformed clock-gated design 705 are localized to specific portions of the design based on the nature of the clock gating techniques used in the power optimized design. Although the generation of these two intermediate design transformations can be shown to be provably correct-by-construction, one may also make use of combinational equivalency checkers as a means to verify the correctness of the transformations (shown as steps A and B in FIG. 7).

The goal is to reduce the frequency of running these two verification steps and only require use of a single equivalency run between the transformed golden 704 and the transformed clock-gated design 705. This procedure is depicted in FIG. 7 as step C. Since this equivalency checking is often between two versions of the design at the same level of abstraction (RTL-to-RTL or gate-to-gate), the state point mapping step is relatively straightforward. In terms of memory usage and run-time, the overall complexity of this equivalency checking is less than a typical RTL-to-gate equivalency checking step.

The foregoing description of the invention has been described for purposes of clarity and understanding. It is not intended to limit the invention to the precise forms disclosed. Various modifications may be possible within the scope and equivalence of the appended claims.

We claim:

1. A method of verifying a power optimized design, comprising:
    analyzing a first design, comprising an original design, with a power optimization engine executing on a processor;
    generating with the power optimization engine a second design, which is functionally equivalent to the first design and is power optimized,
    determining with the power optimization engine, a required number of structural intermediate design transformations;
    generating a plurality of intermediate design transformations corresponding to the required number of design transformations;
    verifying with a combinational equivalency checker, functional equivalency between the first design and the second design by checking the first design and a first design transformation, by checking between each pair of the plurality of intermediate design transformations, and by checking a last design transformation and the second design, wherein a sequence of verification steps is specified by a user; and
    wherein the second design consumes less power than the first design, and the plurality of intermediate design transformations are generated using retiming to move structural locations of registers while maintaining the functional equivalency.

2. The method of claim 1, wherein the power optimization engine generates a set of transformation specifications for the plurality of intermediate design transformations, wherein each transformation specification defines elements of the corresponding intermediate design transformation.

3. The method of claim 2, wherein the transformation specification embodies structural logic modifications including retiming transformations to enable verification using a combinational equivalency checker.

4. The method of claim 2, wherein the transformation specification is modeled using a transformation language that provides a plurality of language constructs to capture the structural logic modifications needed to generate the intermediate design transformations.

5. The method of claim 1, wherein a combinational equivalency checker's support for the retiming is utilized to verify the intermediate design transformations, as part of the sequence of verification steps.

6. The method of claim 1, wherein the power optimized design utilizes either clock-gated or logic gated technology to reduce the power in the second design.

7. The method of claim 6, wherein the either clock-gated or logic gated technology comprises complex clock gating techniques that reduce power consumption in the second design.

8. The method of claim 7, wherein the complex clock gating techniques comprise output side clock gating techniques with relaxed timing constraints, output side clock gating techniques with stringent timing constraints, a combination of output and input side clock gating techniques, and complex input side clock gating techniques.

9. The method of claim 1, wherein the power optimized design utilizes clock-gated and logic gated technology to reduce the power in the second design.

10. The method of claim 1, wherein the sequence of verification steps can be optimized by checking combinational equivalency for a number of designs that is fewer than a sum of the first design, plus the second design, plus the plurality of equivalence transformations, minus one.

11. An electronic design system for verifying a power optimized design of an electronic design comprising:
    one or more processors configured to implement:
        a first design comprising original design elements;
        a power optimization engine that analyzes the first design and generates a second design that is functionally equivalent to the first design and is power optimized, and further determines a required number of structural intermediate design transformations, and generates a plurality of intermediate design transformations corresponding to the required number of design transformations;
        a combinational equivalency checker for checking the functional equivalency between two designs;
        wherein the combinational equivalency checker verifies the equivalence between the first design and the second design by checking the first design and a first design transformation, by checking between each pair of the plurality of intermediate design transformations, and by checking a last design transformation and the second design, wherein the sequence of verification steps is specified by a user; and
        wherein the second design consumes less power than the first design, and the plurality of intermediate design transformations are generated using retiming to move structural locations of registers while maintaining the functional equivalency.

12. The system as in claim 11, wherein the power optimization engine generates a set of transformation specifications for the plurality of the intermediate design transformations, wherein each transformation specification defines elements of corresponding intermediate design transformation.

13. The system of claim 12, wherein the transformation specification embodies structural logic modifications including retiming transformations to enable verification using a combinational equivalency checker.

14. The system of claim 12, wherein the transformation specification is modeled using a transformation language that provides a plurality of language constructs to capture the structural logic modifications needed to generate the intermediate design transformations.

15. The system of claim 11, wherein a combinational equivalency checker's support for the retiming is utilized to verify the intermediate design transformations, as part of the sequence of verification steps.

16. The system of claim 11, wherein the power optimized design utilizes either clock-gated or logic gated technology to reduce the power in the second design.

17. The system of claim 16, wherein the either clock-gated or logic gated technology comprises complex clock gating techniques that reduce power consumption in the second design.

18. The system of claim 17, wherein the complex clock gating techniques comprise output side clock gating techniques with relaxed timing constraints, output side clock gating techniques with stringent timing constraints, a combination of output and input side clock gating techniques, and complex input side clock gating techniques.

19. The system of claim 11, wherein the power optimized design utilizes clock-gated and logic gated technology to reduce the power in the second design.

20. The system of claim 11, wherein the sequence of verification steps can be optimized by checking combinational equivalency for a number of designs that is fewer than a sum of the first design, plus the second design, plus the plurality of intermediate design transformations, minus one.

21. An electronic design system for verifying a power optimized design of an electronic design comprising:
 one or more processors configured to implement:
  a first design comprising original design elements;
  a power optimization engine that analyzes the first design and generates a second design that is functionally equivalent to the first design and is power optimized, and further determines a required number of structural intermediate design transformations, and generates a plurality of intermediate design transformations corresponding to the required number of design transformations;
  a sequential equivalency checker for checking the functional equivalency between two designs;
  wherein the sequential equivalency checker verifies the equivalence between the first design and the second design by checking the first design and a first design transformation, by checking between each pair of the plurality of intermediate design transformations, and by checking a last design transformation and the second design, wherein the sequence of verification steps is specified by a user; and
  wherein the second design consumes less power than the first design, and the plurality of intermediate design transformations are generated using retiming to move structural locations of registers while maintaining the functional equivalency.

22. A reduced power electronic design that is designed by a process comprising:
 analyzing a first design, comprising an original design, with a power optimization engine executing on a processor;
 generating with the power optimization engine a second design, which is functionally equivalent to the first design and is power optimized,
 determining with the power optimization engine, a required number of structural intermediate design transformations;
 generating a plurality of intermediate design transformations corresponding to the required number of design transformations;
 verifying with a combinational equivalency checker, functional equivalency between the first design and the second design by checking the first design and a first design transformation, by checking between each pair of the plurality of intermediate design transformations, and by checking a last design transformation and the second design, wherein a sequence of verification steps is specified by a user; and
 wherein the second design consumes less power than the first design, and
 the plurality of intermediate design transformations are generated using retiming to move structural locations of registers while maintaining the functional equivalency.

* * * * *